United States Patent [19]

Nassar et al.

[11] Patent Number: 5,325,083
[45] Date of Patent: Jun. 28, 1994

[54] MANUAL VALVE POSITION SENSING SYSTEM

[75] Inventors: Roy S. Nassar, Canton; Thomas D. Nogle, Troy; Gerald L. Holbrook, Rochester, all of Mich.

[73] Assignee: Chrysler Corporation, Highland Park, Mich.

[21] Appl. No.: 877,457

[22] Filed: May 1, 1992

[51] Int. Cl.$^5$ .............................................. B60Q 1/00
[52] U.S. Cl. .................................. 340/456; 340/686; 307/9.1; 307/10.1; 200/61.91; 200/61.37; 341/32; 341/76
[58] Field of Search .................. 340/456, 686; 307/9.1, 307/10.1; 200/61.28, 61.37, 61.80, 61.91; 74/473 R, 475, 866, 867, 868, 850; 341/32, 76

[56] References Cited

U.S. PATENT DOCUMENTS

| | | | |
|---|---|---|---|
| 1,170,838 | 2/1916 | Cutler et al. | 74/866 |
| 1,865,506 | 7/1932 | Cordray | 74/866 |
| 3,130,596 | 4/1964 | Gorski | 74/866 |
| 3,139,767 | 7/1964 | Shimanckas | 74/866 |
| 3,423,549 | 1/1969 | Sondej | 74/866 |
| 3,692,157 | 9/1972 | Arnold et al. | 74/850 |
| 3,789,688 | 2/1974 | Minks | 74/850 |
| 3,876,028 | 4/1975 | Asano et al. | 74/866 |
| 3,881,368 | 5/1975 | Furuhashi et al. | 74/866 |
| 3,882,740 | 5/1975 | Förster et al. | 74/866 |
| 3,895,547 | 7/1975 | Murakami | 74/867 |
| 3,898,401 | 8/1975 | Noba et al. | 200/61.91 |
| 3,942,393 | 3/1976 | Förster et al. | 74/866 |
| 3,943,792 | 3/1976 | Sibeud | 74/473 R |
| 3,956,947 | 5/1976 | Leising et al. | 74/866 |
| 4,044,634 | 8/1977 | Florus et al. | 74/866 |
| 4,073,204 | 2/1978 | Dick | 74/866 |
| 4,082,013 | 4/1978 | Dornfeld et al. | 74/866 |
| 4,131,036 | 12/1978 | Ivey et al. | 74/866 |
| 4,174,645 | 11/1979 | Ohmae et al. | 74/866 |
| 4,208,925 | 6/1980 | Miller et al. | 74/866 |
| 4,220,058 | 9/1980 | Petzold | 74/866 |
| 4,244,244 | 1/1981 | Rembold et al. | 74/866 |
| 4,258,591 | 3/1981 | Eckert et al. | 74/866 |
| 4,259,882 | 4/1981 | Miller | 74/866 |
| 4,271,728 | 6/1981 | Wakamatsu | 74/866 |
| 4,275,612 | 6/1981 | Silvester | 74/473 R |
| 4,283,970 | 8/1981 | Vukovich | 74/866 |
| 4,285,252 | 8/1981 | Yamaki et al. | 74/866 |
| 4,290,322 | 9/1981 | Huitema | 475/128 |
| 4,345,489 | 8/1982 | Müller et al. | 475/127 |
| 4,360,718 | 11/1982 | Schobinger et al. | 200/61.88 |
| 4,429,196 | 1/1984 | Beig et al. | 200/61.88 |
| 4,485,443 | 11/1984 | Knödler et al. | 74/866 |
| 4,527,448 | 7/1985 | Person et al. | 74/866 |
| 4,535,412 | 8/1985 | Cederquist | 364/511 |
| 4,610,179 | 9/1986 | Parker | 74/473 R |
| 4,610,179 | 9/1986 | Parker | 74/473 R |
| 4,660,430 | 4/1987 | Bortfield et al. | 74/473 R |
| 4,667,540 | 5/1987 | Yagi | 74/866 |
| 4,680,988 | 7/1987 | Mori | 74/866 |
| 4,693,142 | 9/1987 | Kurihara et al. | 74/866 |
| 4,724,723 | 2/1988 | Lockhart et al. | 74/854 |
| 4,926,172 | 5/1990 | Gursek | 74/473 R |
| 4,998,450 | 3/1991 | Nogle | 74/850 |
| 5,009,128 | 4/1991 | Seidel et al. | 74/473 R |

FOREIGN PATENT DOCUMENTS 0126468 11/1978 Japan ..................................... 74/850

Primary Examiner—John K. Peng
Assistant Examiner—Nina Tong
Attorney, Agent, or Firm—Mark P. Calcaterra

[57] ABSTRACT

A sensing system is provided for sensing the position of a manual gear select lever in an automatic transmission. The sensing system includes a plate member movable in response to movement of a shift lever and has a contact surface having a predetermined pattern of electrically conductive and non-conductive areas. An electrical sensing unit is mounted in the transmission so as to communicate with the contact surface of the plate member. A plurality of electrical contacts extend from the sensing unit to contact the conductive and non-conductive areas on the contact surface and generate binary codes in accordance with the position of the shift lever. Combinations of binary codes are provided for the operating modes and require at least two bit changes therebetween. In addition, transition codes are provided between each of the operating modes. The binary codes are provided to a transmission controller which determines the predetermined operating mode and transition modes therebetween.

14 Claims, 3 Drawing Sheets

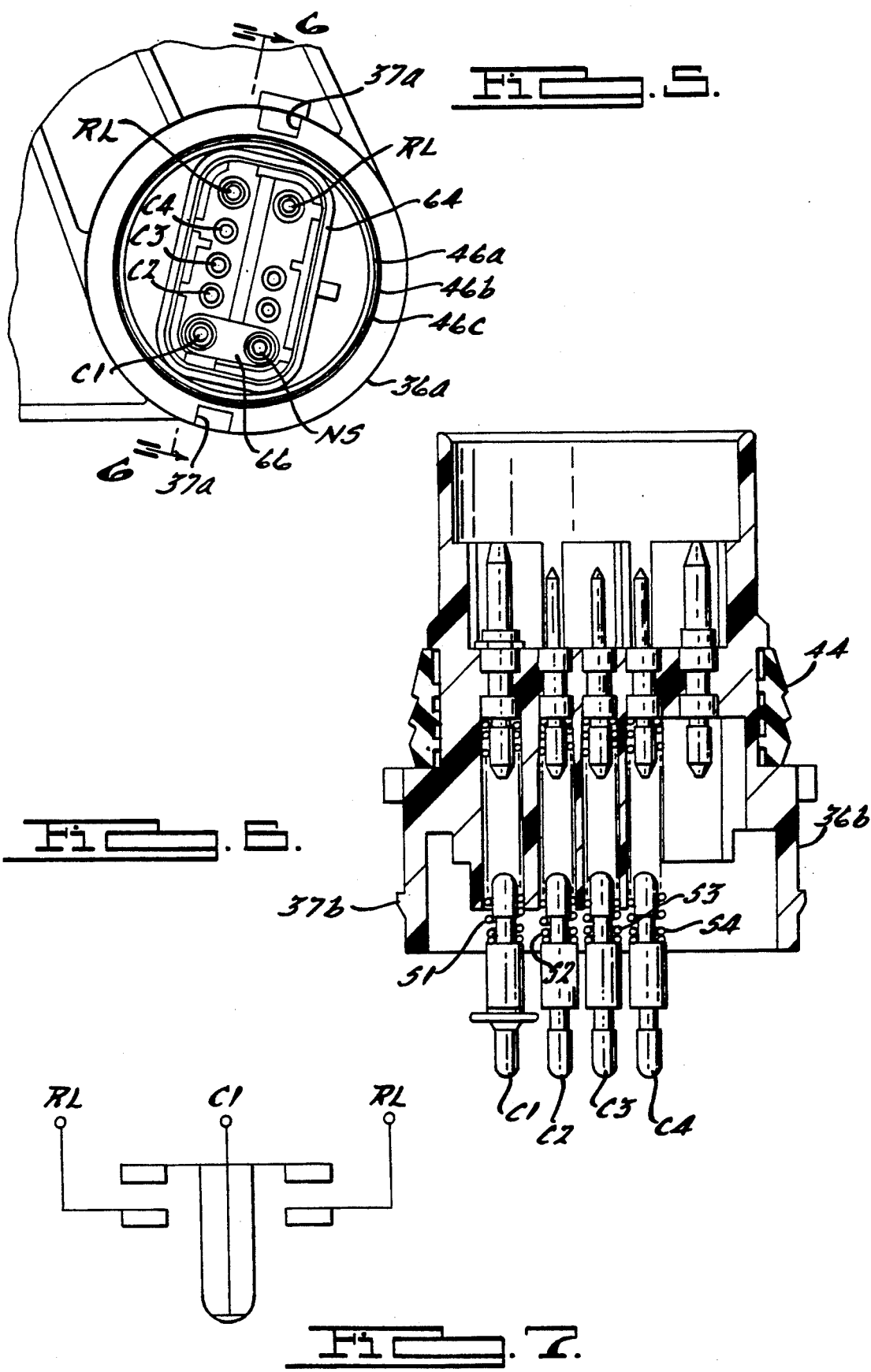

MANUAL VALVE POSITION SENSING SYSTEM

BACKGROUND OF THE INVENTION

1. Field Of The Invention

The present invention relates generally to an automatic transmission primarily intended for motor vehicle use and, more particularly, to a sensing system for generating codes which represent the position of a manual gear select lever in an automatic transmission.

2. Description Of Related Art

In recent years, advanced forms of transmission control have been proposed which offer the possibility of enabling an automatic transmission to adapt itself to changing conditions. In this regard, U.S. Pat. No. 3,956,947, issued on May 18, 1976 to Leising, et al, sets forth a fundamental development in this field. Specifically, this patent discloses an automatic transmission design which features an "adaptive" control system that includes electronically operated solenoid-activated valves for controlling certain fluid pressures.

Currently, there exists a comprehensive four-speed automatic transmission system which features fully adaptive electronic control. A thorough discussion of such a transmission control system is contained in U.S. Pat. No. 4,998,450 issued on Mar. 12, 1991 to Nogle and entitled "Neutral Start Switch To Sense Shift Lever Position", which is commonly owned by the assignee of the present application. This patent is hereby incorporated by reference. The transmission control system includes a microcomputer-based controller which receives input signals indicative of engine speed, turbine speed, output speed (vehicle speed), throttle angle position, brake application, predetermined hydraulic pressures, driver selected gear and operating conditions (PRNODDL), engine coolant temperature, and/or ambient temperature. This controller generates command or control signals for causing the actuation of a plurality of solenoid-actuated valves which regulate the application and release of pressure to and from the frictional units of the transmission system.

The above transmission control system further discloses a neutral start switch for sensing the position of a manually operated shift lever to select between a plurality of predetermined operating modes. With reference to FIGS. 4B and 19 of the Nogle patent, a plate member moves in response to a shift lever and provides a cam surface at the edge with electrically conductive and non-conductive areas. A pair of separate sensors are mounted in the transmission such that an electrical contact pin of each sensor communicates with the cam surface. The signal from the electrical contact pin of each sensor combine to generate a binary code indicative of the shift lever position. Each sensor has a first contact and a second contact. The first contact travels on the cam surface while the second contact closes whenever the first contact is extended within a groove. However, this technique eliminates some of the possible binary code combinations since the first contact generally does not conduct with the second contact closed. As a result, changes between some of the manual shift lever operating positions involve single bit changes between the respective binary code combinations.

It is therefore an object of the present invention to provide for an improved sensing system which generates binary codes in response to the position of the manual gear select lever in an automatic transmission.

In particular, it is one object of the present invention to provide for a sensing system which generates combinations of binary codes which require two or more bit changes between any selected operating modes.

It is another object of the present invention to provide for improved transition codes between the operating modes of the transmission.

It is a further object of the present invention to provide for an easily installable sensing unit which has low manufacturing tolerance and good electrical contact sensing capability.

SUMMARY OF THE INVENTION

In accordance with the teachings of the present invention, a sensing system is provided for detecting the position of a manually operated shift lever which enables the vehicle operator to select between a plurality of predetermined operating modes in an automatic transmission. The sensing system includes a plate member movable in response to movement of a shift lever and provided with a predominantly flat contact surface having a plurality of electrically conductive and non-conductive areas arranged in a predetermined pattern. An electrical sensor unit is mounted in the transmission in a position to communicate math the contact surface of the plate member. A plurality of electrical contact pins engage the conductive and non-conductive areas on the contact surface and generate a binary code having combinations thereof which represent each of the shift lever positions. Binary code combinations are provided for the operating modes and require at least a two bit change between any two operating modes. In addition, transition codes are provided between each of the operating modes. The binary codes are preferably provided to a controller which preferably compares the codes with predetermined position coding.

BRIEF DESCRIPTION OF THE DRAWINGS

Other objects and advantages of the present invention will become apparent to those skilled in the art upon reading the following detailed description and upon reference to the drawings in which:

FIG. 5 is a plan view of a top portion of a sensing unit which illustrates electrical connections provided for connection to a controller;

FIG. 6 is a cross-sectional view of the sensing unit taken along line 6-6 in FIG. 5; and FIG. 7 is a schematic diagram which illustrates a multi-function contact for providing back-up lighting.

DETAILED DESCRIPTION OF THE PREFERRED EMBODIMENT

Figure 1:
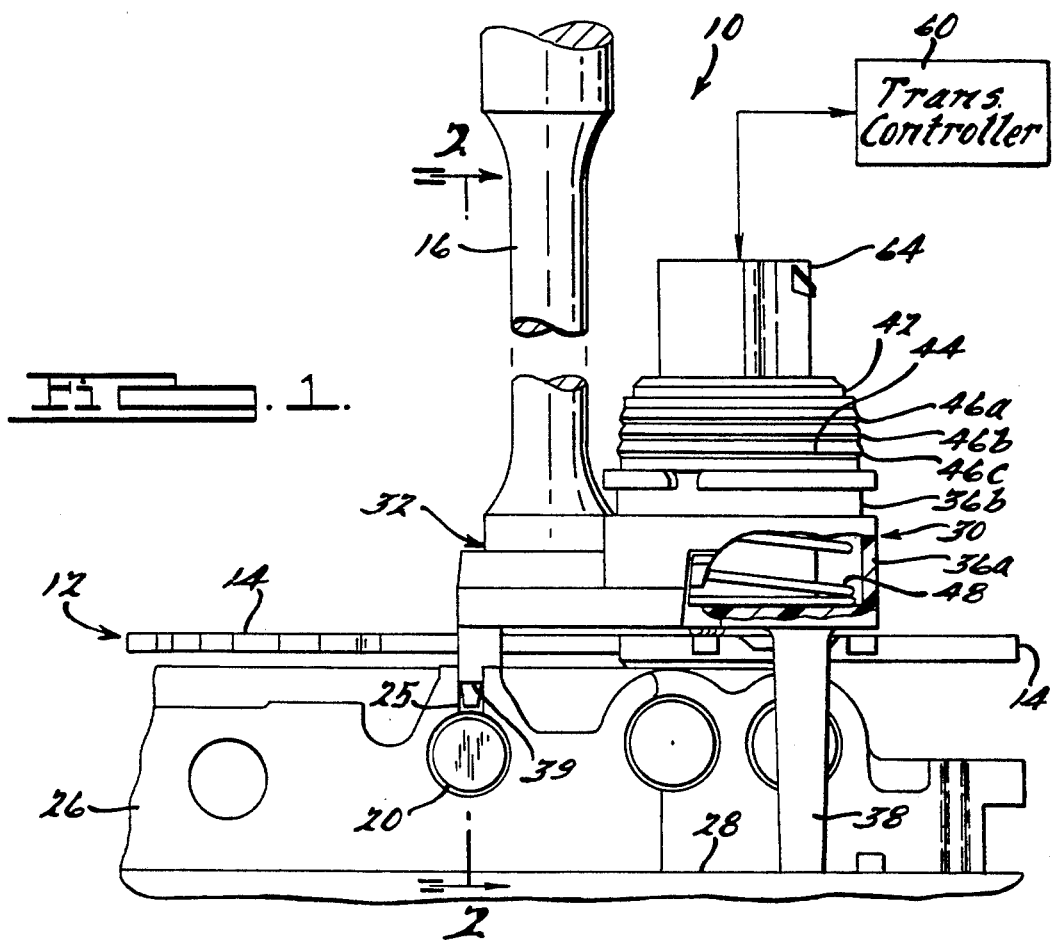
FIG. 1 is an elevation view of a manual valve position sensing assembly in accordance with the present invention.
Figure 2:
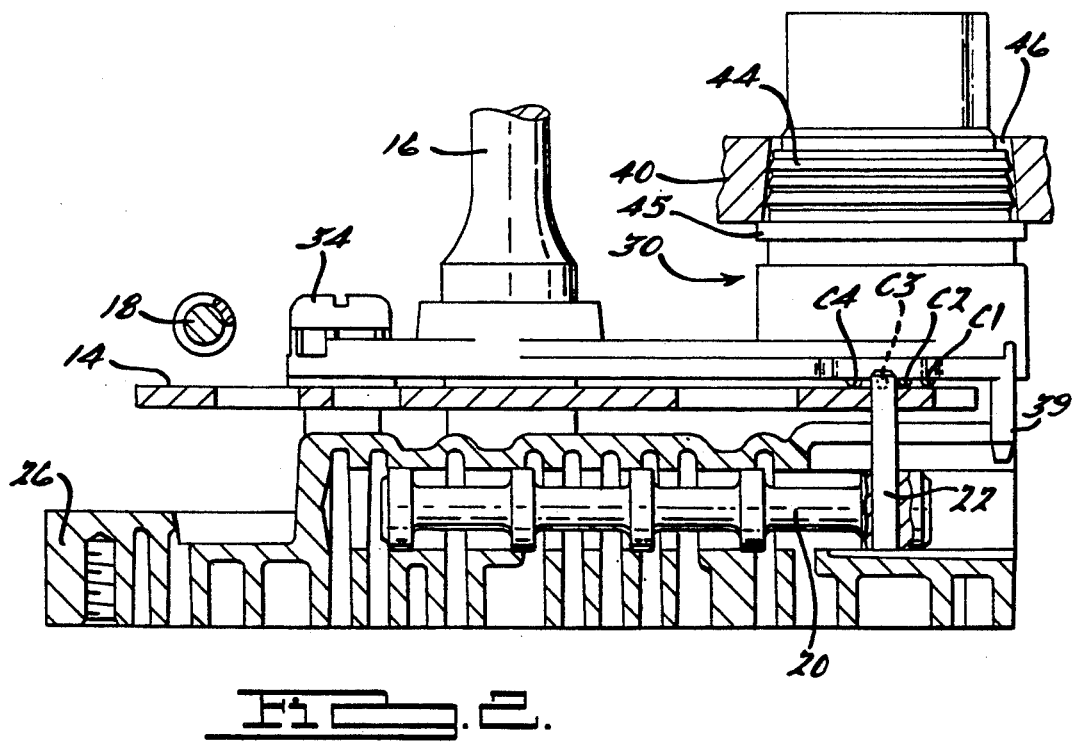
FIG. 2 is a cross-sectional view of the manual valve position sensing system taken along line 2—2 of FIG. 1.
Figures 3, 3A, 4:
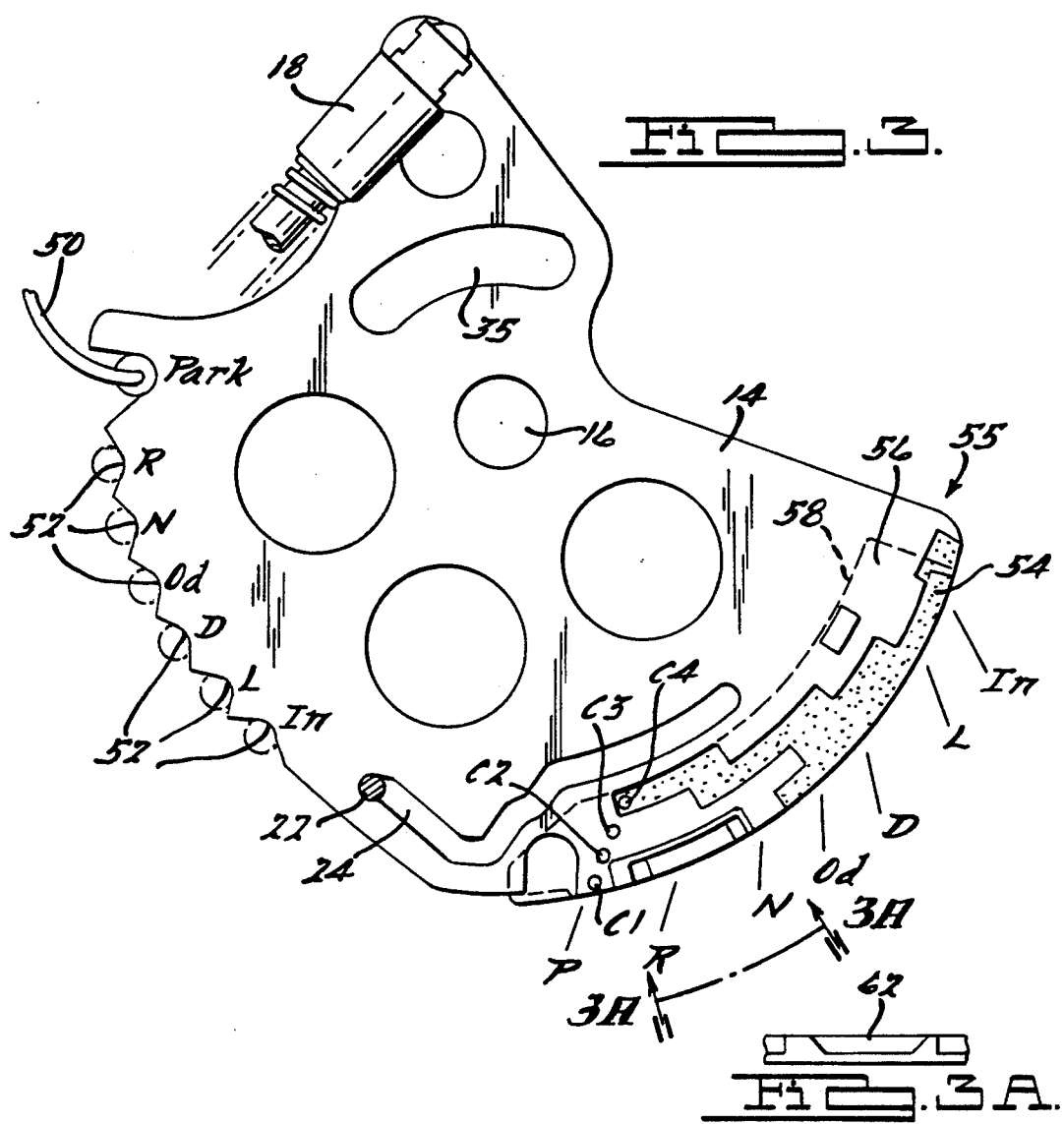
FIG. 3 is a plan view of a shift lever with a plate member having a contact surface composed of conductive and non-conductive areas in accordance with the present invention.
FIG. 3A is a cross sectional view taken through Section 3A—3A in FIG. 3.
FIG. 4 is a schematic diagram and associated table which illustrates the combinations of binary codes generated in response to the conductive and non-conductive areas on the contact surface.

Turning now to FIGS. 1–3, position sensing assembly 10 is shown therein for sensing the position of a manual gear select lever in an automatic transmission. The sensing assembly 10 includes a manual valve lever assembly 12 which has a metal plate 14 connected to a shaft member 16. The shaft member 16 is generally mounted within a support structure (not shown) having an opening which allows for rotational movement of the manual valve lever assembly 12. The manual valve lever assembly 12 is attached to a shift rod (not shown) which is movable by an operator of a vehicle to select amongst a plurality of transmission operating modes such as park, reverse, neutral, overdrive, drive and low (PRNODDL). FIGS. 2 and 3 also show that a Park pawl rod 18 is connected to the metal plate 14 to permit actuation of the Park pawl rod by the manual valve lever assembly 12.

The manual valve lever assembly 12 rotates in response to an operator input amongst positions which generally represent operating modes for an electronically controlled automatic transmission. In doing so, the manual valve lever assembly 12 has a cam surface composed of a slot or cam groove 24 formed on the metal plate 14 as shown in FIG. 3 which engages a valve pin 22. The valve pin 22 is connected to a manually operated valve 20 for controlling the hydraulic fluid flow throughout a valve assembly 26 in an automatic transmission. As such, the rotation of the manual valve lever assembly 12 causes the cam groove 24 to move the manually operated valve 22 to predetermined positions which in turn controls the hydraulic fluid system of the transmission.

A sensing unit 30 is mounted above a portion of the metal plate 14 for sensing the position of the manual valve lever assembly 12. The sensing unit 30 has an opening 32 through which the shaft member 16 extends. The sensing unit 30 is fastened to the valve assembly 26 via a shouldered screw or bolt 34. A slot 35 is provided in the metal plate 14 as shown in FIG. 3 which allows lever 12 to rotate about the shaft member 16 while the sensing unit 30 remains stationary. The sensing unit 30 includes a two-piece plastic housing which is comprised of members 36a and 36b. The member 36a includes a pair of diametrically opposed openings 37a in the vertical cylindrical wall which enable a snap fit connection with a pair of sloping ribs 37b on the corresponding cylindrical wall of the member 36b when the member 36b is inserted into the member 36a.

The sensing unit 30 further includes four spring loaded electrical contact pins C1 through C4 which extend therefrom and contact conductive and non-conductive areas on a contact surface on metal plate 14. In this regard, it should be understood that the electrical contact pins C1 through C4 extend in a generally perpendicular relationship to the plane of the plate 14. The sensing unit 30 further includes a support member 38 which abuts a base plate 28 on the valve assembly unit 26. The support member 38 thereby supports and stabilizes the sensing unit 30 and provides substantially uniform contact between each of the electrical contacts C1 through C4 and the metal plate 14. In addition, the sensing unit 30 has an arm member 39 for engaging a groove 25 through which valve pin 22 moves above the manually operated valve 20. As such, the arm member 39 allows for proper alignment of the sensing unit 30 with the manual valve lever assembly 12 and further prevents undesirable movement.

The sensing assembly 10 is positioned substantially within a transmission case 40. As such, the sensing unit 30 is mounted within a tapered opening 46 in the transmission case 40. The sensing unit 30 has a collar 42 with a tapered and ribbed rubber seal 44 mounted thereon and an outward extending member 45 which abuts the transmission case 40. The compliant rubber seal 44 has at least three outwardly extending ribs 46a through 46c and three inwardly extending ribs which oppose the outward ribs. Each of ribs 46a through 46c has a front side with a relatively steep surface in comparison to the back side. As such, the tapered rubber seal 44 is easily positioned and mounted within the similar sized tapered opening 46 in the transmission case 40 and sealed thereto. The relatively steep back surface on each of ribs 46 provides for an improved seal which is easily installed and advantageously more difficult to remove. The inward extending ribs are used to give better unit loading without totally filling the volume of the available cavity.

The sensing unit 30 further has a coil spring 48 positioned therein between the housing members 36a and 36b. When the sensing unit 30 is mounted to the transmission case 40, the spring 48 is partially compressed. The compression forces the support member 38 against the base plate 28 and further forces the electrical contacts C1 through C4 against the plate member 14. As a result, the spring loaded electrical contacts C1 through C4 are partially compressed and thereby provide good uniform contact with the plate member 14. Furthermore, spring 48 assures a consistent and reliable load on the tapered seal 44. In addition, the sensing unit 30 further includes an electrical connection member 64 which is connected to a transmission controller 60.

A top view of the manual valve lever assembly 12 with the plate member 14 is shown in FIG. 3. The manual valve lever assembly 12 has a cam groove 24 routed through the metal plate 14 to provide the cam surface for receiving the manually operated valve pin 22. As such, rotation of the manual valve lever assembly 12 causes the valve pin 22 to move the manually operated valve 20 back and forth in accordance with predetermined valve settings. The manual valve lever assembly 12 further has notches formed on the outer edge of the metal plate 14 for engaging a detent spring 50. As the manual valve lever assembly 12 is rotated, the detent spring 50 engages operating notches 52 for each of the operating modes (PRNODDL) and further for an installation mode (In).

The manual valve lever assembly 12 has non-conductive plastic 54 molded onto an outer portion of the metal plate 14. The metal plate 14 in conjunction with the non-conductive plastic 54 forms a contact surface 55 with conductive areas 56 and non-conductive areas 54 positioned in a pattern which is designed to cooperate with the contacts C1 through C4 in creating the desired binary code. The non-conductive plastic 54 is molded substantially flush to the top surface of the metal plate 14 with the exception of a groove 62 formed below contact C1 when in the reverse operating mode. The non-conductive plastic 54 is further molded to the bottom surface of the metal plate 14 as shown by dotted line 58. As such, the conductive areas 56 and non-conductive areas 54 are easily moved against the electrical contacts C1 through C4.

The manual valve lever assembly 12 is shown in FIG. 3 while engaged in the park operating mode. As the manual valve lever assembly 12 is moved between the plurality of operating modes, the conductive area 56 and non-conductive areas 54 travel against the electrical contacts C1 through C4. In doing so, the sensing unit 30 senses either conductive or non-conductive contact for each of the electrical contacts C1 through C4. Electrical contact with a conductive area 56 grounds the electrical contact and thereby generates a binary code "0". In contrast, electrical contact with a non-conductive area 54 generates a binary code "1". The binary codes generated by each of electrical contacts C1 through C4 are then provided the transmission controller 60. The transmission controller 60 preferably compares the binary codes with predetermined combinations of binary codes to determine the position of the manual valve lever assembly 12.

The binary coded combinations are illustrated in the table in FIG. 4. Discreet binary coded combinations are provided for hard events or operating modes which include park (P), reverse (R), neutral (N), over-drive (OD), drive (D) and low (L). In addition transition codes T1, T2 and T3 are generated between each of the operating modes. To move from one operating mode to any other operating mode the binary code combinations require at least a two bit change. The requirement of a two bit change provides additional assurance that the shift lever position is properly sensed and creates less of a likelihood of obtaining an incorrect position sensing due to a single contact failure. Likewise, a two bit change is required between each of the transition codes T1, T2 and T3. In addition, the combinations of binary codes preferably do not include combinations of either all binary coded zeros or all binary coded ones.

The transition codes T1, T2 and T3 allow for the transmission controller 60 to detect transitions between given operating modes. The transition codes T1, T2 and T3 essentially provide for hysteresis between each of the operating mode positions (PRNODDL). In addition, transition codes T1 and T2 separate the three hydraulic modes of operation which are reverse (R), neutral (N) and drive (OD, D and L) and thereby provide the controller 60 with known regions where hydraulic port changes are expected to occur. As a result, transition code T1 includes the hydraulic port changes between park (hydraulic neutral provided in park) and reverse while transition T2 includes changes between reverse, neutral and drive hydraulic porting. Furthermore, transition T3 provides hystersis between the overdrive, drive and low operating modes, as no port changes occur within the T3 code.

A portion of the top view of the sensing unit 30 is shown in FIG. 5 which illustrates the lead terminal connections that are employed for connection with the transmission controller 60. The lead terminal connections include the four electrical contacts C1 through C4. In addition a pair of reverse light connectors RL are provided for allowing connection to a back-up light circuit. Furthermore, a park/neutral start ground connection NS is provided for energizing a relay (not shown) which in turn enables the vehicle to be started only when the park or neutral operating modes are sensed. The lead terminal connection for electrical contact C1 is connected to the park/neutral start ground connection NS via a primary jumper located inside the sensor 30 and secondary metal bar 66.

FIG. 6 is a cross sectional view of the sensing unit 30 which illustrates the contacts C1 through C4 in conjunction with the lead terminal connections. The electrical contacts C1 through C4 are spring loaded contacts having springs S1 through S4 for providing adequate and substantially uniform force between each of electrical contacts C1 through C4 and the contact surface on the metal plate 14. In addition, electrical contact C1 is a multi-function contact which provides for an additional contact RL as shown in FIG. 7. When the reverse operating mode is selected, contact C1 is positioned above the groove 62 formed in the metal plate 14. As can be seen by viewing FIGS. 3 and 3A contact C1 extends in the groove 62 and closes the contact RL which energizes a back-up lighting circuit for the vehicle.

It should also be noted that the openings 37a in the housing member 36a of the sensor unit 30 permit the transmission fluid to flow through the internal compartment of the sensor unit 30. In other words, all of the contacts C1-C4 and their internal springs S1-S4 are freely open to the oil and mist common to the inside of the transmission. As such, these elements are effectively protected from atmospheric corrosion, contamination, condensation, arcing or fretting sometimes associated with external switches and sensors. Accordingly, it should be appreciated that with the design of the present invention, no elaborate seals, plating or filler grease is required to protect the electrical characteristics of the sensor unit 30.

It should also be appreciated that the present invention provides an inherently accurate design which does not require specific adjustments. In this regard, the present invention directly senses the functional parts without any intermediate (and therefore "variable") components. The present invention also ties the manual valve (hydraulic) selections, the Park engagement-release, the spring-detent feel, and the electrical codes together in a very precise manner, which is least susceptible to process variables, tolerance zones or confusion during assembly.

In operation, the manual valve position sensing assembly 10 monitors and determines the position of the manual valve lever assembly 12. A vehicle operator manually moves the manual valve lever assembly 12 via a shift linkage mechanism to select amongst a plurality of operating modes (PRNODDL). In doing so, the manual valve lever assembly 12 rotates beneath the sensing unit 30 so that the electrical contacts C1 through C4 thereby contact conductive and non-conductive areas 56 and 54 to generate combinations of binary codes which represent the position of the manual valve lever assembly 12. The combinations of binary codes provide for operating codes which are separated by transition codes T1, T2 and T3. The binary coded combinations are then provided to the transmission controller 60. The transmission controller 60 may thereby compare the binary codes with predetermined combinations of codes to determine the manual valve lever assembly 12 position and ensure proper operation of the transmission.

While this invention has been described in connection with a four contact position sensing system it is not limited solely to the four electrical contacts C1 through C4 nor is it limited to the operating modes described herein in connection with an electronically controlled automatic transmission. For example, the number of electrical contacts employed for sensing the shift lever position for an automatic transmission will be dependent upon the number of operating modes. In addition, the invention may be employed for automatic transmissions which are not substantially electronically controlled so long as a logic controller is provided for receiving the binary codes.

In view of the foregoing, it can be appreciated that the present invention enables the user to achieve an improved sensing system for sensing the position of a manually operated shift lever for an automatic transmission. Thus, while this invention has been disclosed herein in connection with the particular example thereof, no limitation is intended thereby except as defined by the following claims. This is because the skilled practitioner will recognize that other modifications can be made without departing from the spirit of this invention after studying the specification and drawings.

We claim:

1. In a vehicle transmission including a controller for processing and storing input signals and predetermined values and providing output signals to control friction elements of the transmission, a sensing assembly for sensing the position of a manually operated shift lever which is used to select between a plurality of predetermined operating modes of the transmission, comprising:
   a plate member movable in response to movement of the shift lever, said plate member having a major face with a substantially flat contact surface, said contact surface having a predetermined pattern of electrically conductive and non-conductive areas thereon;
   an electrical sensor unit mounted in the transmission and positioned to communicate with the contact surface of the plate member; and
   a plurality of electrical contact members associated with said sensor unit for contacting said conductive and non-conductive areas on said contact surface, each of said contact members engaging said contact surface along one of a plurality of paths as said contact members and said contact surface move relative to one another, said engagement between said contact members and said contact surface generating binary codes having combinations which are indicative of the shift lever position in each of the predetermined operating modes and the transitions between said operating modes.

2. The sensing assembly as defined in claim 1 wherein said combinations of binary codes comprise: a first group of combinations from said plurality of combinations of binary codes, each of said combinations from said first group representing the position of the manually operated shift lever engaged in one of said operating modes; and
   a second group of combinations from said plurality of combinations of binary codes, each of said combinations from said second group representing transition positions between adjacent manual lever positions engaged in said operating modes.

3. The sensing assembly as defined in claim 2 wherein each of said combinations of binary codes from said first group has at least two binary codes that change when shifting the position of the shift lever between any two of said operating modes.

4. The sensing assembly as defined in claim 1 wherein each of said combinations of binary codes from said second group has at least two binary codes that change between each of said transition positions.

5. The sensing assembly as defined in claim 1 wherein:
   movement of said plate member controls the position of a manually operated valve for controlling hydraulic fluid flow within said transmission system; and
   said sensor unit is positioned in relation to said manual valve.

6. The sensing assembly as defined in claim 1 wherein each of said electrical contact members comprise a spring loaded contact.

7. The sensing assembly as defined in claim 6 wherein said sensor unit further includes a reverse light contact associated with one of said spring loaded contacts for energizing a reverse back-up light circuit in a reverse operating mode.

8. The sensing assembly as defined in claim 1 wherein said sensor unit further includes a neutral start contact for allowing the vehicle to start while in a park or neutral operating mode.

9. The sensing assembly as defined in claim 1 wherein said sensor unit is mounted within a tapered opening in a transmission case and comprises:
   an enclosure having a member which extends through said opening; and
   a rubber tapered seal between a portion of said member and said opening having a plurality of ribs for engaging said tapered opening and forming a seal therewith.

10. A position sensing system comprising:
    a shift member for selecting one of a plurality of predetermined operating modes;
    a plate member movable in response to movement of said shift member and having a substantially flat contact surface having a predetermined pattern of electrically conductive and non-conductive areas;
    a sensor unit having a plurality of electrical contact means for engaging said contact surface so as to contact said electrically conductive and non-conductive areas to produce a plurality of combinations of binary codes, wherein a first group of combinations from said plurality of combinations of binary codes represent said predetermined operating modes, each of said combinations of binary codes within said first group representing one of said operating modes and having at least two binary codes which are different from binary codes in the other combinations within said first group, and wherein a second group of combinations from said plurality of combinations of binary codes represent transition modes between each of said operating modes; and
    a controller for receiving the combinations of binary codes and comparing said binary codes with predetermined combinations of binary codes to determine the operating mode selected.

11. The sensing system as defined in claim 10 further comprising:
    a manual valve movable in response to said shift member for controlling a fluid operated system.

12. The sensing assembly as defined in claim 10 wherein said electrical contact means comprises a plurality of spring loaded contacts.

13. The sensing assembly as defined in claim 10 wherein each of said combinations within said second group representing one of said transition modes has at least two binary codes which are different from binary codes in the other combinations within said second group.

14. In a vehicle transmission including a controller for processing and storing input signals and predetermined values and providing output signals to control friction elements of the transmission, a sensing assembly for sensing the position of a manually operated shift lever which is used to select between a plurality of predetermined operating modes of the transmission, comprising:
- a plate member movable in response to movement of the shift lever and provided with a contact surface having a predetermined pattern of electrically conductive and non-conductive areas;
- an electrical sensor unit mounted in the transmission and positioned to communicate with the contact surface of the plate member; and
- electrical contact means associated with said sensor unit for contacting said conductive and non-conductive areas on said contact surface and for generating binary codes having combinations which are indicative of the shift lever position in each of the predetermined operating modes and the transitions between said operating means, wherein said combinations of binary codes include:
- a first group of combinations from said plurality of combinations of binary codes, each of said combinations from said first group representing the position of the manually operated shift lever engaged in one of said operating modes and each of said combinations of binary codes from said first group has at least two binary codes that change when shifting the position of the shift lever between any two of said operating modes, and
- a second group of combinations from said plurality of combinations of binary codes, each of said combinations from said second group representing transition positions between adjacent manual lever positions engaged in said operating modes.

* * * * *